United States Patent [19]
Liesegang

[11] 3,895,788
[45] July 22, 1975

[54] SUSPENSION DEVICE PARTICULARLY FOR PIPES

[75] Inventor: Gerhard Liesegang, Zeven-Aspe, Germany

[73] Assignee: Lisega Rohrleitungszubehor GmbH, Zeven-Aspe, Germany

[22] Filed: Feb. 11, 1974

[21] Appl. No.: 441,213

[30] Foreign Application Priority Data
Feb. 10, 1973 Germany............................ 2306674

[52] U.S. Cl................................ 267/70; 248/54 CS
[51] Int. Cl.............................................. F16f 1/26
[58] Field of Search............ 267/70, 69; 248/54 CS, 248/54 R, 66

[56] References Cited
UNITED STATES PATENTS

| | | | |
|---|---|---|---|
| 2,391,467 | 12/1945 | Loepsinger...................... | 248/54 CS |
| 2,949,270 | 8/1960 | Wood.............................. | 248/54 CS |
| 3,588,010 | 6/1971 | Liesegang...................... | 248/54 CS |

*Primary Examiner*—James B. Marbert
*Attorney, Agent, or Firm*—Diller, Brown, Ramik & Wight

[57] ABSTRACT

This disclosure relates to a suspension device comprising means for biasingly suspensionally supporting an element and spring means disposed transversely to the latter-mentioned biasingly supporting means for compensating for variations in tractive and compressive forces imposed on the latter means by the suspended element.

12 Claims, 2 Drawing Figures

SUSPENSION DEVICE PARTICULARLY FOR PIPES

This invention relates to a spring suspension device for biasingly suspendingly supporting elements, such as pipes, and is designed to provide a substantially constant suspension force.

Suspension devices are conventionally known which exert a constant supporting force on a load, such as a pipe which may expand due to heat, and in view thereof, a spring is provided to take up or compensate for tractive and/or compressive forces due to such expansion (or contraction). In such conventional mechanisms, the arrangement is such that a rod which supports the load is connected to a cam positioned between rollers which are fixed in guide rails which constrain the rollers for motion only in a vertical plane.

In such suspension devices, there is extremely high frictional loss on the rollers which takes or expends a considerable amount of the main suspension spring energy thereby making the device extremely vunerable to wear and break down. The frictional loss takes place primarily because of the friction caused between the rollers and the side guide rails as well as because of the cam configuration, which is generally circular, causing pressure between the rollers and the cam when the latter moves. Moreover, the compensating spring in such conventional devices is generally located at one end of the mechanism and exterior of the housing thereof which constitutes a relatively high risk of damage.

In view of the foregoing, a primary object of this invention is to provide a novel spring suspension device which acts as a constant hanger or suspender considerably reducing friction losses as compared to conventional devices and which possesses structural advantages heretofore unknown.

According to the present invention there is provided a spring suspension device for suspending an element, such as pipes which may expand or contract, and in addition to a main spring for suspending the main load, there is provided a transversely located compensatory spring arranged to compensate for variations in the tractive and compressive forces of the main suspension spring, the compensatory spring forcing rollers against cams or abutment faces to maintain uniformity of suspension depending upon increase or decirease of load conditions.

With the above and other objects in view that will hereinafter appear, the nature of the invention will be more clearly understood by reference to the following detailed description, the appended claims and the several views illustrated in the accompanying drawings:

Figure 1:
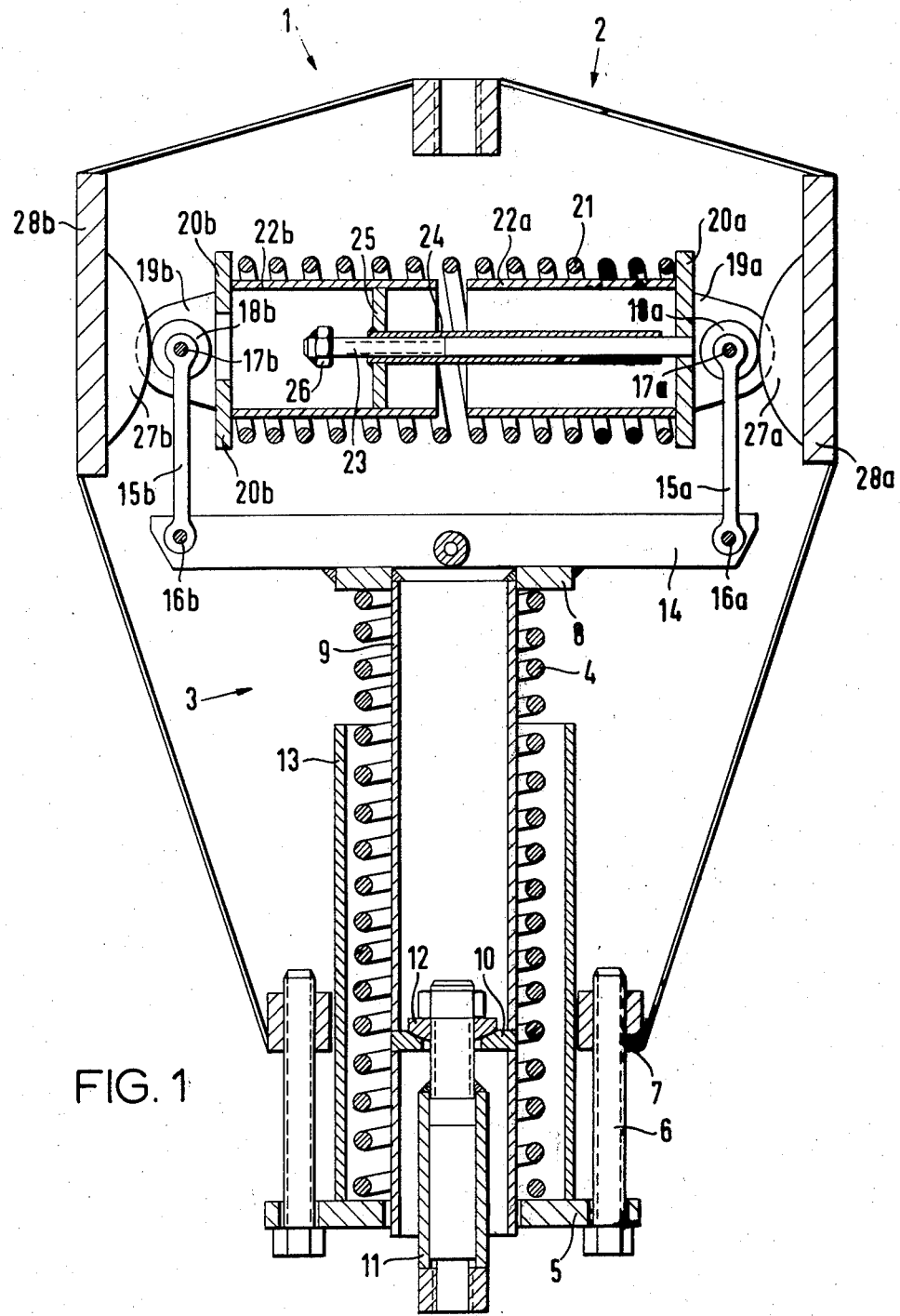
FIG. 1 is a cross sectional view of a novel spring suspension device constructed in accordance with this invention, and illustrates a compensatory spring disposed transverse to a load bearing spring and acting to bias rollers against cam or thrust blocks.

A novel suspension device constructed in accordance with this invention is generally designated by the reference numeral 1 and includes a housing or suspendable portion 2 and a load bearing or carrying portion 3. The housing portion 2 is a casing within which the load bearing portion 3 is located, and the latter includes a main spring 4 supported at one end against a lower thrust block or plate 5 which is adjustable vertically for adjusting the biasing force of the spring 4 by means of bolts 6 carried by a cross piece 7 of the housing portion 2. An opposite end of the spring 4 bears against a thrust block or plate 8 to which is connected by welding or otherwise a tube 9 provided internally with a cross plate 10 on which a carrier bolt 11 is suspended by a nut (unnumbered) with a dome washer 12 interposed between the nut (unnumbered) and the cross plate 10. The carrier bolt 11 is connected in an appropriate manner to the element or load to be carried, namely, a pipe or the like (not shown). The spring 4 is preferably protected by a sleeve 13 surrounding the same which extends throughout a major portion of the length of the spring 4, as is readily apparent from FIG. 1.

Connected to the annular thrust block or plate 8 is a cross piece or plate 14 at opposite ends of which are pivotally attached links 15a, 15b, by pivot pins 16a, 16b, respectively. At opposite ends of the links 15a, 15b are entrained rollers 18a, 18b by means of pivot pins or spindles 17a, 17b, respectively. The spindles or pivot pins 17a, 17b are in turn journalled on lugs 19a, 19b of abutment plates 20a, 20b, respectively between which spans a compensatory spring 21. The plates 20a, 20b carry respective tubes 22a, 22b which serve as internal guides for the exteriorly surrounding spring 21. The plate 20a includes a bolt 23 suitably fixed thereto which slides in a sleeve 24 rigidly fixed to a cross wall 25 located within the tube 22b. A nut 26 on the bolt 23 forms a stop which limits the distance at which the plates 20a, 20b may be spaced from each other.

Figure 2:
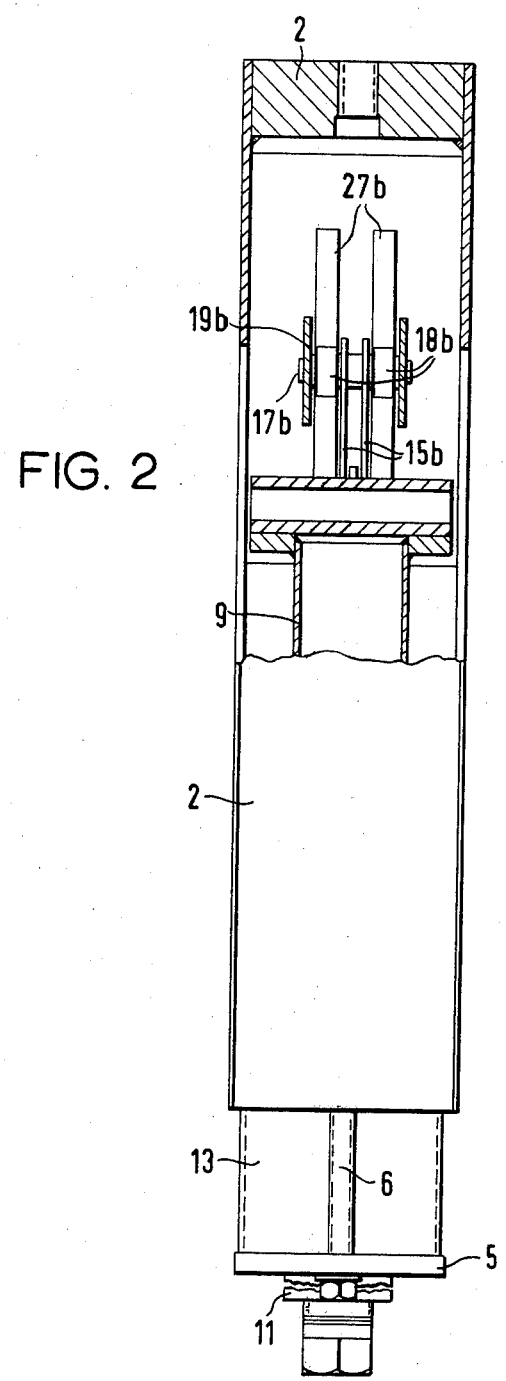
FIG. 2 is a fragmentary side elevational view of the novel spring suspension device of this invention, and illustrates details of rollers associated with the thrust or cam plates.

The rollers 18a, 18b respectively engage arcuate cams 27a, 27b located on reinforced side walls 28a, 28b, respectively, of the housing portion 2. The rollers 18a, 18b are mounted by means of bearings (not shown), preferably needle bearings, upon the spindles or pivots 17a, 17b. Instead of a single roller, it is preferable that pairs of rollers are associated with the cams which are also disposed in pairs, as is readily apparent from FIG. 2.

The entire length of the spring 21, the abutment plates 20a, 20b, and the rollers 18a, 18b are located within the housing or casing 2 and are thus protected thereby. The links 15a, 15b insure free axial movement of the plates 20a, 20b with the associated guide tubes 22a, 22b all force being excluded. The links 15a, 15b and the plates 20a, 20b form with the spring 21 and the cross piece 14 a generally parallelogram linkage which moves vertically up and down within the housing 2 as the load bearing portion 3 moves down or up. In the normal position under load, the rollers 18a, 18b engage the highest rise of the cams 27a, 27b, in the manner illustrated in FIG. 1. Therefore, depending upon the direction of vertical displacement of the load caused by contraction or expansion of, for example, a laden pipe the rollers 18a, 18b can roll up or down the curve portions of the cams 27a, 27b to achieve a constant hanging force irrespective of the particular environment and/or load involved.

While preferred forms and arrangements of parts have been shown in illustrating the invention it is to be clearly understood that various changes in details and arrangement of parts may be made without departing from the spirit and scope of this disclosure.

I claim:

1. A spring suspension device comprising means for biasingly suspendingly supporting an element, said last-mentioned means including a main suspension spring, means disposed transversely of said main suspension spring for compensating for variations in tractive or compressive forces of the main suspension spring, said compensating means including a pair of spaced cams having opposed convex cam surfaces, a pair of tubes having aligned axes disposed between said cam surfaces, a cam follower carried by each tube in rolling contact with an associated cam surface, common guide means for maintaining said tubes in axially aligned relationship, and a single spring for biasing said tubes and the cam followers carried thereby toward the associated convex cam surfaces.

2. The spring suspension device as defined in claim 1 wherein said single spring is in external telescopic relationship to said pair of tubes.

3. The spring suspension device as defined in claim 1 wherein said guide means is in internal telescopic relationship to said pair of tubes.

4. The spring suspension device as defined in claim 1 wherein said single spring is in external telescopic relationship to said pair of tubes, and said guide means is in internal telescopic relationship to said pair of tubes.

5. The spring suspension device as defined in claim 1 wherein said pair of tubes define a relatively movable arm of a parallelogram linkage means between said cam followers and said main suspension spring.

6. The spring suspension device as defined in claim 1 wherein said pair of tubes define a relatively movable arm of a parallelogram linkage means between said cam followers and said main suspension spring, said parallelogram linkage means is further defined by a link pivotally connected to each of said pair of tubes and another link pivotally connected to and between said first-mentioned links.

7. The spring suspension device as defined in claim 6 wherein said main suspension spring is carried by said another link.

8. The spring suspension means as defined in claim 7 wherein said pair of tubes include abutment means between which is sandwiched said single spring.

9. The spring suspension device as defined in claim 7 wherein said single spring is in external telescopic relationship to said pair of tubes.

10. The spring suspension device as defined in claim 7 wherein said guide means is in internal telescopic relationship to said pair of tubes.

11. The spring suspension device as defined in claim 7 wherein said single spring is in external telescopic relationship to said pair of tubes, and said guide means is in internal telescopic relationship to said pair of tubes.

12. The spring suspension means as defined in claim 11 wherein said pair of tubes include abutment means between which is sandwiched said single spring.

* * * * *